April 20, 1937.   H. L. ROBERTS   2,078,098
DISPENSER FOR GROUND COFFEE, ETC
Filed Oct. 25, 1935
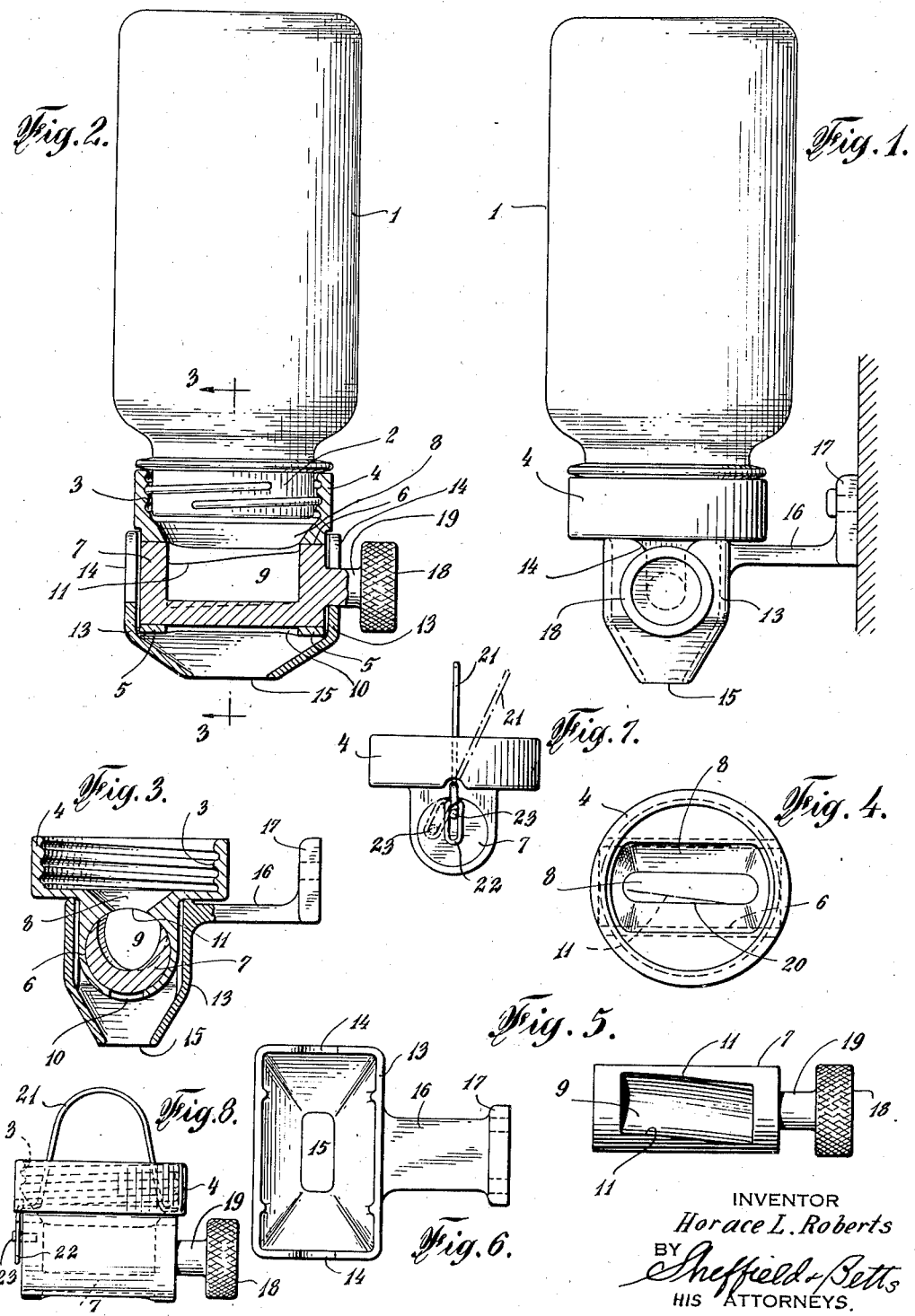
INVENTOR
*Horace L. Roberts*
BY
*Sheffield & Betts*
HIS ATTORNEYS.

Patented Apr. 20, 1937

2,078,098

UNITED STATES PATENT OFFICE 2,078,098

DISPENSER FOR GROUND COFFEE, ETC.

Horace L. Roberts, Mount Vernon, N. Y.

Application October 25, 1935, Serial No. 46,711

2 Claims. (Cl. 221—106)

The object of this invention is to provide means for dispensing and measuring ground coffee so that it may be divided easily into separate portions according to the number of persons to be served without exposing the ground coffee within the receptacle to the outer atmosphere.

For a detailed description of one form of my invention, which I at present deem preferable, reference may be had to the following specification and accompanying drawing, in which—

Fig. 1 is a side elevation of my improved dispensing device;

Fig. 2 is an elevational view taken substantially at right angles to that of Fig. 1 and showing portions of the apparatus in vertical cross-section.

Fig. 3 is a transverse sectional view taken substantially on the line 3—3 of Fig. 2;

Fig. 4 is a plan view of the main portion of the device, with the measuring cylinder removed and showing the opening in the bottom of said main portion;

Fig. 5 is a plan view of the cylindrical or measuring portion of my device;

Fig. 6 is a plan view of the casing or housing adapted to contain and support the dispensing device;

Fig. 7 is an end view of a modification; and

Fig. 8 is a side view thereof.

Referring to the drawing, the numeral 1 indicates a suitable receptacle preferably made of glass in the general form of a well known so-called "Mason jar", which is provided with a screw-threaded neck 2 over which a cap or cover may be screwed when the device is used simply as a jar or container.

As shown in Figs. 1 and 2 the screw-threaded portion 2 of the jar is adapted to screw into an internally screw-threaded recess 3 in a metallic casing or closure 4, preferably in the form of a casting of suitable metal or other material. The casting 4 is provided with a downwardly-projecting portion 5 through which extends a cylindrical opening 6. Said opening is adapted to receive a measuring member 7, in the general form of a hollow cylinder, one side of which is open so that the said cylinder may be filled with coffee through a passage 8 communicating with the interior of said cylinder, as shown at 9. The lower portion of said casting 4 is provided with a longitudinal passage or slot indicated at 10, which slot allows the ground coffee to fall downward when the cylinder 7 is rotated so that its open portion or slot 11 is at the bottom instead of at the top. The opposite side of said cylinder 12 is then located directly below the passage 8 and so prevents more of the coffee from falling downward.

As a fixed support for the parts above described I have provided a substantially rectangular socket member 13 which is provided at its outer ends with recesses or notches 14 and the tapering bottom thereof is provided with an opening or slot 15. Said housing is provided with a lateral arm 16 which is attached to a plate 17 or other device by which it may be secured to a wall by screws as indicated in Fig. 1, or otherwise. One end of the hollow cylinder 7 is provided with a knurled knob 18 which is connected with said cylinder by a short stub-shaft 19. Said knurled knob provides means for rotating the cylinder 7 within the cylindrical opening 6 in the casting 4.

By referring to Figs. 5 and 6 it will be seen that the lower portion of the casting 4 is provided with a longitudinal slot 8 while the cylindrical rotatable part 7 is provided with an inclined slot 11.

The capacity of the rotatable cylindrical part 7 is so designed as to contain one portion of ground coffee to correspond to a serving to one person and so that the coffee delivered through the slot or opening 15 will be enough to make one cup of coffee. The cylinder, of course, may be then rotated through the position shown in Fig. 3 where it is again filled with coffee, after which the cylinder is further rotated so that the edges 11 pass the edges of the slot 10 and the second amount of coffee is discharged and constitutes a portion available for another serving of the coffee that may be brewed in any suitable coffee making apparatus or device. The measuring may be repeated according to the number of persons to be served.

It should be noted that at all times the ground coffee remaining in the receptacle in practically sealed off from the atmosphere so that the aroma and flavor is retained indefinitely.

From the above description it will be appreciated that I have provided a dispenser which is principally adapted for measuring portions of coffee to correspond to individual helpings or cups when brewed but it may obviously be used for delivering other granular material, such as cereal, when it is desired to measure such cereal for portions to be served to various numbers of individuals.

The modification shown in Figs. 7 and 8 comprises means for loosening the ground coffee in case it should be used in the form of very fine particles such as when nearly pulverized. Coffee when ground to that degree of fineness sometimes has a tendency to bridge over the outlet opening in the main portion of the closure and therefore does not flow freely into the measuring portion of the device.

For use in such instances, a pivoted agitator in the form of a wire 21 or similar movable part is horizontally journalled in the closure itself above the cylindrical opening. Both ends of the wire are carried pivotally by horizontal journal bearings in the closure or casting 4 and one end that projects therethrough being bent downward and formed into a loop 22. A pin 23 projects from the end of the cylinder 7 and enters the loop 22. Upon rotation of the cylinder 7 the pin 23 will cause the wire 21 to oscillate and so agitate the finely ground coffee surrounding it, thus destroying any bridging or caking that may occur in the container 1.

Having thus described these embodiments of my invention, I do not wish to be understood as being limited to the details or form of arrangement of parts specified therein, for various changes may be made by those skilled in the art without departing from the spirit and scope of my invention as set forth in the appended claims.

What I claim and desire to protect by Letters Patent is:

1. A measuring device adapted to close the outlet opening of and to support a separable container for ground coffee, comprising, a casing provided with detachable means for holding the same across the outlet opening of said container, said casing being provided with a transverse partition having a slot therein and below which is a cylindrical opening having its axis substantially parallel with said slot, there being a delivery passage in said casing at the bottom thereof, a hollow rotatable cylinder in said cylindrical opening and provided with a longitudinal slot communicating with the interior thereof, means for rotating said cylinder, and a socket member for receiving the lower part of said casing and adapted to hold the device in a fixed position.

2. A measuring device adapted to close the outlet opening of and to support a separable container for ground coffee, comprising, a casing provided with detachable means for holding the same across the outlet opening of said container, said casing being provided with a transverse partition having a slot therein and below which is a cylindrical opening having its axis substantially parallel with said slot, there being a delivery passage in said casing at the bottom thereof, a hollow rotatable cylinder in said cylindrical opening and provided with a longitudinal slot communicating with the interior thereof, means for rotating said cylinder, an agitating device comprising a wire having suitable bearings at each end in the walls of said casing and operatively connected with said cylinder to oscillate the wire and cause said ground coffee to fall downward into said hollow cylinder, and a socket member for receiving the lower part of said casing and adapted to hold the device in a fixed position.

HORACE L. ROBERTS.